Figure 1:
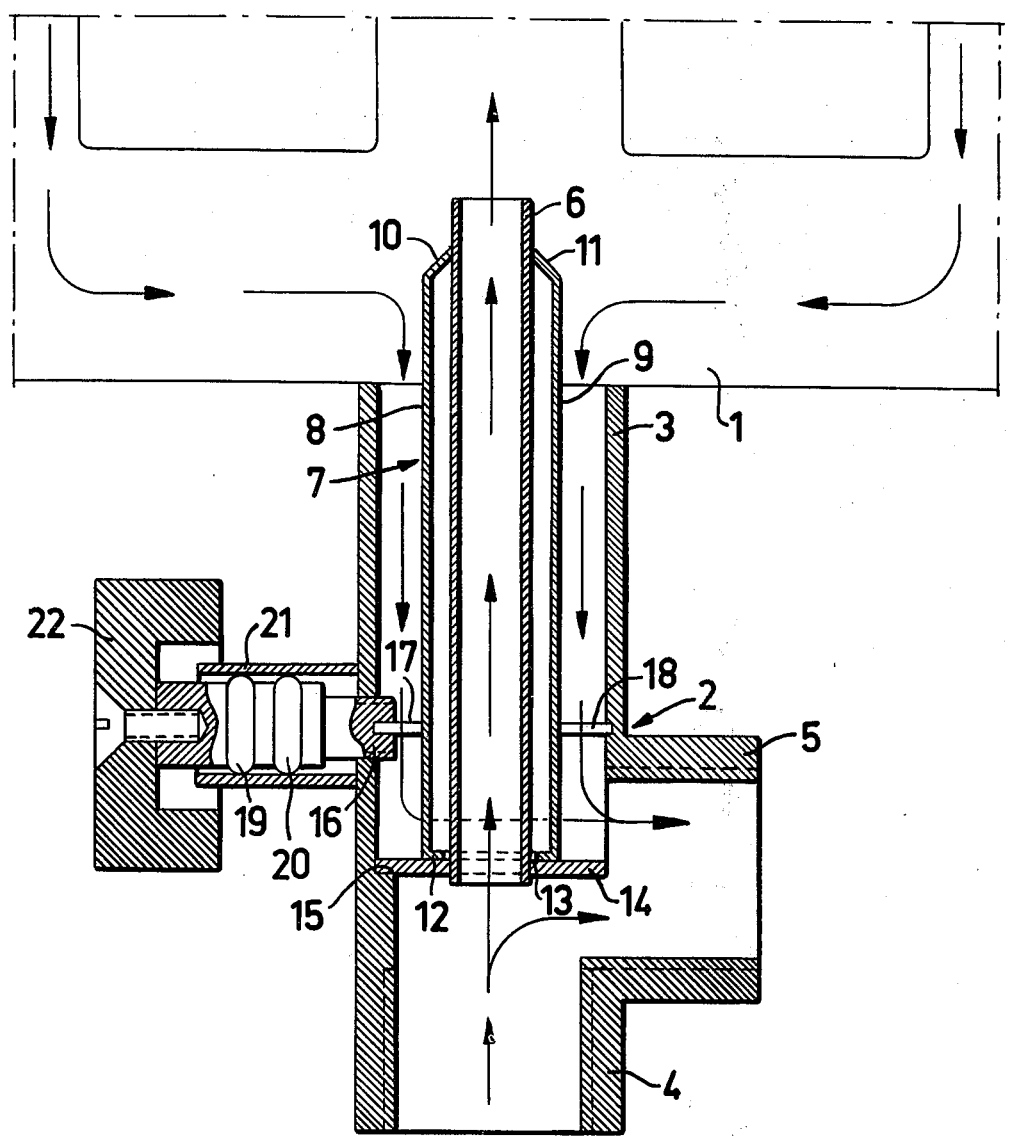

ately aligned with the axis of the branched-off conduit. A flexible hose or tube is sealingly mounted in the opening of the washer and extends through the part of the pass-through conduit attached to the radiator. A U-shaped bimetal element is mounted in the valve housing and has its legs extending on each side of the flexible tube so as to press around the tube at increasing temperature and thereby diminish the flow through the radiator.
United States Patent [19]
Christiansson

[11] 3,901,438
[45] Aug. 26, 1975

[54] THERMOSTAT-REGULATED RADIATOR VALVE FOR SINGLE OR DOUBLE CONDUIT CENTRAL HEATING SYSTEMS

[75] Inventor: Fingal Christiansson, Vastervik, Sweden

[73] Assignee: Fingal Christiansson Ingeniorsbyra, Vastervik, Sweden

[22] Filed: Feb. 19, 1974

[21] Appl. No.: 443,933

[30] Foreign Application Priority Data
Feb. 19, 1973 Sweden................... 029915/73

[52] U.S. Cl................ 236/43; 236/101; 165/35; 251/4
[51] Int. Cl.²............................. F24F 11/00
[58] Field of Search............. 236/43, 40, 101 E, 93, 236/103; 137/599.1; 251/4; 165/35, 40

[56] References Cited
UNITED STATES PATENTS

| | | | |
|---|---|---|---|
| 2,109,628 | 3/1938 | Alban et al. | 236/93 |
| 2,558,152 | 6/1951 | Perkins | 251/4 |
| 2,763,433 | 9/1956 | Hill | 236/93 |
| 2,930,594 | 3/1960 | MacCracken | 251/4 |
| 2,952,337 | 9/1960 | Coffin | 236/93 |
| 3,513,881 | 5/1970 | Kinsell | 236/93 |

Primary Examiner—William E. Wayner
Assistant Examiner—William E. Tapolcai, Jr.
Attorney, Agent, or Firm—Pollock, Philpitt & Vande Sande

[57] ABSTRACT

A thermostat-regulated radiator valve for a single or double conduit central heating system comprising a generally T-shaped valve housing including one pass-through conduit and one perpendicularly branched-off conduit. The valve housing is mounted underneath a radiator with one end of the pass-through conduit in fluid communication with the radiator. An annular washer is coaxially mounted in the pass-through conduit at the junction between the pass-through conduit and the branched-off conduit and is substantially aligned with the axis of the branched-off conduit. A flexible hose or tube is sealingly mounted in the opening of the washer and extends through the part of the pass-through conduit attached to the radiator. A U-shaped bimetal element is mounted in the valve housing and has its legs extending on each side of the flexible tube so as to press around the tube at increasing temperature and thereby diminish the flow through the radiator.

7 Claims, 2 Drawing Figures

THERMOSTAT-REGULATED RADIATOR VALVE FOR SINGLE OR DOUBLE CONDUIT CENTRAL HEATING SYSTEMS

The present invention relates to a thermostat-regulated radiator valve for single and double conduit central heating systems comprising a sensing body supported in a conduit from a radiator, said sensing body controlling the flow through the radiator in dependence on the temperature of the heat transmitting medium flowing from the radiator and consisting of bimetal and directly actuating the flow through the radiator by means of its motion upon a change of the temperature.

The temperature in a room has always a certain constant relation to the temperature of the return water from a radiator. Provided there is a constant volume flow through a radiator at a constant supply temperature, the temperature of the return water will be dependent on the temperature of the room. Thus the temperature of the return water will be lowered with decreasing room temperature and will rise with increasing room temperature.

By having the temperature of the return water control the volume flow through a radiator, it is thus possible to obtain a regulation of the room temperature, i.e. for maintaining a constant room temperature (at a constant outdoor temperature) the volume flow through the radiator is adjusted so that the return water is given a constant temperature. Thus, if the room temperature for some reason is lowered below a set value, this causes a decrease of the temperature of the return water, which in turn calls for an increase of the volume flow so that the return water again reaches a temperature corresponding to the set value of the room temperature. This temperature of the return water can of course be another than the original one, if the decrease of the temperature for instance is caused by a lowered outdoor temperature, i.e. increased heat emission from the room.

The present invention concerns a thermostat regulated radiator valve of the type indicated above for a single- or double conduit central heating system, which is adapted to be mounted in such a way that it senses the temperature of the return water from a radiator and regulates the flow of same. The radiator valve of the invention has been given the characteristic features defined in the appended claims.

The invention will now be described with reference to the drawings, in which

Figure 2:
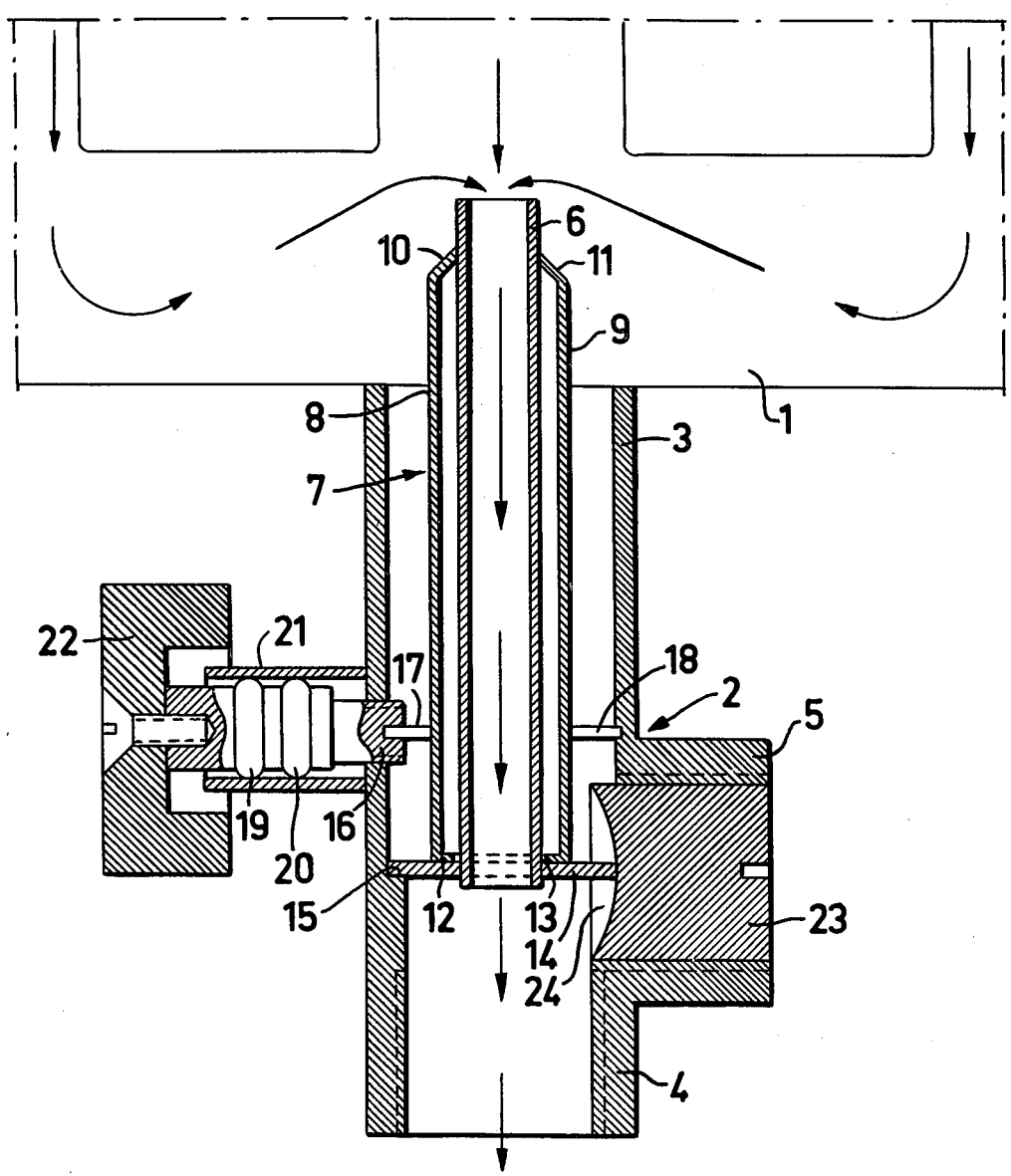

FIG. 1 shows a section of a valve according to the invention adapted for a single conduit system and FIG. 2 shows a valve adapted for a double conduit system.

In FIG. 1 a radiator 1 of a single conduit hot water circulation system is shown, which is provided with a valve according to the invention. This valve comprises a valve housing 2 having approximately the form of a T-conduit, one pass-through conduit, portion 3 of which is connected to the bottom of the radiator 1. The other pass-through conduit portion 4 of the valve body and the branched off conduit portion 5 are formed with threads for receiving conduits for feed water and return water respectively. Inside the conduit portion 3 and substantially coaxial therewith a thermostatic regulating device is mounted which comprises a tube 6 of a resilient, pliable material, such as Teflon, and a sensing body 7 of bimetal, which encloses the tube 6 in such a way that it pinches one end portion of the pipe, and more tightly at increasing temperature.

The sensing body 7 comprises a flat strip of bi-metal, which is bent to a U-shape with the extreme tips 10 and 11, respectively, of the U-legs 8 and 9 converging somewhat. A hole 13, having a slightly larger diameter than the tube 6 through the web 12 of the U-member provides some clearance between the latter and the tube. The tube 6 is tightly secured in a hole in an annular washer 14 supported by a shoulder 15 formed in the valve housing substantially coincident with the centre line of the conduit portion 5, said shoulder extending along an arc of a circle perpendicularly to the pass-through conduit portions 3 and 4. The flat (as shown) or curved circle 12 of the U-member abuts the washer 14.

An adjusting screw 16 extends through a threaded hole in the wall of the valve housing 1. The front end of the screw is formed with a bore, into which a projection 17 from the leg 8 of the U-member 7 extends, such projection being provided by a rivet or a tongue punched out of the bimetal. A corresponding projection 18 is provided in the leg 9 and extends into a bore in the wall of the valve housing diametrically opposite said bore in the front end of the adjusting screw. The adjusting screw is sealed in suitable manner, e.g. by O-rings 19, 20, in a bushing 21 attached to the wall of the valve housing, and is provided with an adjusting knob 22, for screwing it into or out of the valve housing.

Feed water enters into this valve through the conduit portion 4 and is divided by the washer 14 into one flow through the conduit 6 and one flow through the branched off conduit portion of the valve housing which can be connected to another radiator in the system or back to the heat generating unit. The hot water entering through the tube 6 will flow upwardly to the top of the radiator 1 and will sink subsequently downwardly through the radiator and will find its way past the sensing body 7 outside the tube 6 and through the conduit portion 5 guided by the washer 14 and will become mixed with the feed water diverted against the other side of the washer 14. As shown in FIG. 1, there is a full flow through the tube 6, i.e. the temperature of the return water corresponds to the setting of the room temperature selected by means of the adjusting screw 16. If the room temperature should now rise due to the sun, for example, this causes a rise of the temperature of the return water, which in turn has the effect that the legs of the sensing body bend towards each other. By that reason the tips of the legs 10 and 11 tighten around the tube 6 and increase their throttling action through the tube.

It should be noted that in a state of permanence at normal room temperature the tube 6 is throttled somewhat so that there is a possibility for both an increase and a decrease of the flow. This is achieved by the adjusting screw being screwed past the non-actuating position shown, when the knob 22 is set to usual room temperature.

By screwing in the adjusting screw, fully the flow through the tube 6 can be shut off completely and independently of temperature, the preloading of the legs of the sensing body preferably being so great that only a decrease of temperature close to the freezing point can bring apart their tips to restore some flow through the tube 6.

In FIG. 2, the valve according to the invention is shown adapted for a double conduit system, the reference numerals used in FIG. 1 denoting similar details. As is immediately apparent, this embodiment differs from that described above in that a plug 23 formed with a concave inner end 24 with the same radius of curvature as the washer 14 is screwed into the branched conduit portion 5. The plug 23 is screwed fully home to make its spherical surface seal against the washer 14. The feed water is led in usual manner into the radiator 1, and the return water flows through the tube 6 and the passage 4 of the valve back to the heat generating unit. Thus, while in a two-conduit system the return water is led through the tube 6 instead of outside the latter, the temperature will still act on the sensing body to control the flow through the tube.

What is claimed is:

1. A thermostat regulated radiator valve for central heating systems comprising:
    bi-metal means mounted within a conduit conducting fluid from a radiator for controlling fluid flow through the radiator in dependence on the temperature of the outgoing flow from the radiator,
    a resilient pliable tube means in said conduit capable of conducting the whole flow from the radiator,
    said bi-metal means being of U-shape and with the legs thereof pinching said tube means between their ends to a variable degree to regulate fluid flow therethrough.

2. The valve as claimed in claim 1, wherein a middle position joining the legs of the bi-metal means is formed with an opening for the passage of the resilient tube means.

3. The valve as claimed in claim 2, wherein said opening has such a diameter that there is clearance between the tube means and the rim of said opening.

4. The valve as claimed in claim 2 comprising a valve housing, wherein said middle portion of the bi-metal means surrounds said tube means close to one of its ends, said one end tightly fitting within the central hole of a washer mounted in said valve housing, said middle portion of the bi-metal means abutting said washer and the said tube means extending away from the washer between the legs of the bi-metal means and past their extreme ends, said ends preferably being slightly inwardly bent.

5. The valve as claimed in claim 4, wherein the legs of the bi-metal means have aligned lateral projections, one projection engaging a wall of the valve housing and the other projection engaging, said screw engaging a threaded hole through the wall of the valve housing aligned with said other projection, said adjusting screw being capable on actuation to preset the relative position of the legs of the bi-metal means.

6. The valve as claimed in claim 4, wherein the resilient tube means and the bi-metal means extend into the radiator.

7. A thermostat-regulated radiator valve for central heating systems comprising:
    temperature-responsive means mounted within a conduit conducting fluid from a radiator for controlling fluid flow through the radiator in dependence on the temperature of the outgoing flow from the radiator,
    a resilient pliable tube means in said conduit for conducting fluid from the radiator,
    said responsive means being effective in response to the temperature of the fluid in the conduit to pinch the tube means and thereby vary its fluid-carrying capacity and thereby control the fluid flow according to the temperature of the return fluid flow in the conduit.

* * * * *